July 3, 1956  W. GILMER, III  2,753,225
ROD END BEARING
Filed Nov. 29, 1951
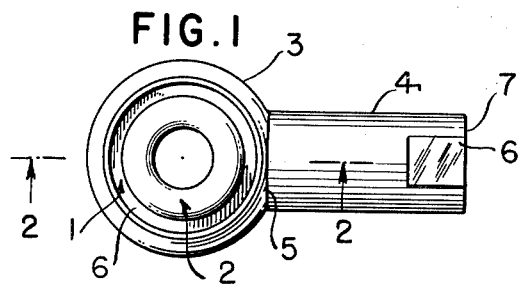
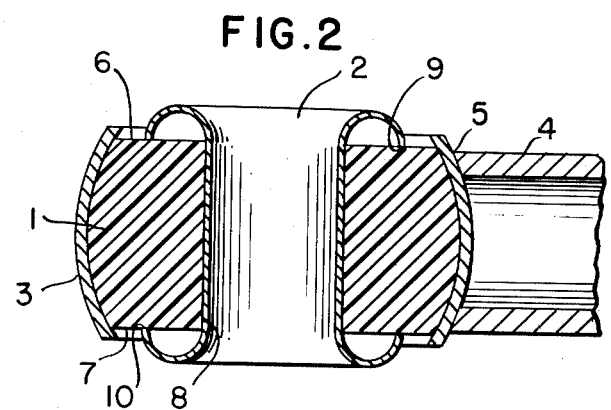
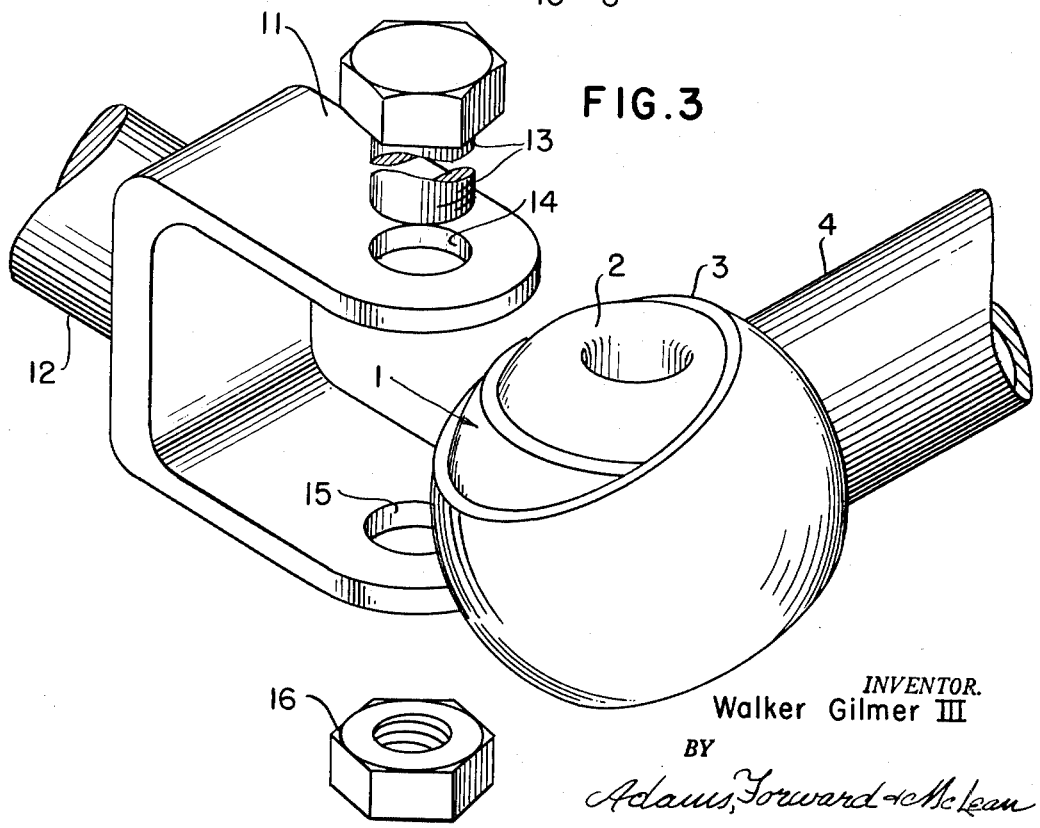
INVENTOR.
Walker Gilmer III
BY
Adams, Forward & McLean
ATTORNEYS

United States Patent Office 2,753,225
Patented July 3, 1956

2,753,225

ROD END BEARING

Walker Gilmer III, Fresh Meadows, N. Y.

Application November 29, 1951, Serial No. 258,789

2 Claims. (Cl. 308—72)

My invention relates to self-aligning rod end bearings utilized to transmit reciprocating and oscillating mechanical motion. In particular, my invention is a novel self-aligning rod end bearing of light, durable and simple construction which isolates vibration and is highly resistant to abrasion, and in which the resilient ball comprising the bearing member may be easily and economically replaced if worn or damaged in use.

Self-aligning rod end bearings are frequently employed in mechanical links, for example in aircraft control rods, where non-rigid linkages are desirable. Typically, such bearing is a metallic mono-ball bearing, having a hole through its center, encased by a soft metal bushing held within a retaining ring. Usually, the retaining ring is fixed to a shank for securing on the end of one link rod and connection is made to a second link rod by a bolt passing through the hole in the ball bearing and through the end of the second link rod.

Self-aligning rod end bearings of this type have a short life since they are subject to sudden shock when used, as well as to continuous engine vibrations transmitted along the link rods. The lubricants used with such bearings collect dirt which aggravates abrasion in the metal to metal bearing surfaces. Moreover, such self-aligning rod end bearings are expensive as they usually require carefully machined ball bearings made of stainless steel or chrome plated. Their replacement is difficult and generally involves removing the entire end bearing including the retaining ring, bushing and shank in addition to the ball bearing.

The self-aligning rod end bearing provided by my invention utilizes a non-metallic resilient ball having a central bore and flat surfaces at each end of the bore with a tubular metallic spacer fitted tightly through the bore of the ball and embracing the flat surfaces of the ball. The spacer projects beyond the width of the retaining ring in order to permit the bearing to be self-aligning and serves as a restraint against the swelling of the resilient ball ends, thereby preventing the ball from being extruded from the outer retainer when side loads are applied. This non-metallic resilient ball is housed snugly within a metallic spherical retaining ring which acts as a race for the ball and which has a shank for attaching to a link rod in the conventional manner or is formed as an integral part on the end of the link rod. The bolt employed to connect the bearing with a second link rod passes through the center of the tubular spacer in the conventional manner.

By employing a non-metallic resilient ball, metal to metal abrasion is avoided. The resilient ball isolates shock and vibration. Thus, the life of my rod end bearing is prolonged and wear is minimized. Moreover, lubrication is unnecessary, and a major disadvantage of conventional bearings is overcome.

Replacement of the ball and spacer can be easily made by rotating them 90° from the normal position within the retaining ring at which point the ball with the spacer may be pushed out and a new ball and spacer inserted in the retaining ring. Thus, replacement of worn or damaged bearings does not involve any complicated procedure with heavy tools in difficultly accessible positions.

In the drawings, Figure 1 is a plan view of the self-aligning rod end bearing of my invention. Figure 2 is a sectional elevation view of the bearing in Figure 1 taken on line 2—2 in Figure 1 and drawn to a larger scale than Figure 1.

Figure 3 is an exploded isometric drawing of the rod end bearing of Figure 1 illustrating it as a connection between two mechanical link rods.

In the drawing the reference numeral 1 indicates a non-metallic resilient ball which has flat ends 6 and 7 and a central bore 8. Ball 1 is molded of a non-metallic resilient material having a Shore Durometer Rating on the A-scale of about 75 and is smoothly finished particularly along its spherical surface.

Tubular metallic spacer 2 passes tightly through central bore 8 of ball 1. Ends 9 and 10 of spacer 2 project beyond flat ends 6 and 7, respectively, of ball 1 and are rolled back to embrace flat surfaces 6 and 7.

Ball 1 is retained by metallic spherical retaining ring 3. The diameter of the inner spherical surface of ring 3 approximates the diameter of the spherical surface of ball 1 with a small clearance, so as to fit ball 1 snugly. Retaining ring 3 is formed in a single integral piece with shank 4 by machining both from a single piece or metal or by electric welding shank 4 to ring 3 at joint 5. Shank 4 is tapped at end 7 and is conventionally provided with diametrically opposed flat surfaces 6 at tapped end 7.

Referring in particular to Figure 3 of the drawing, it will be seen that typical connection of the bearing is made with a forked end 11 of link rod 12 by passing bolt 13 through hole 14 of forked end 11, through spacer 2 and through hole 15, respectively, bolt 13 being secured by nut 16. As will be observed in Figure 3, spacer 2 projects beyond the flattened ends 6 and 7 of ball 1 and beyond the width of retaining ring 3, and thus permits the bolted rod end bearing to rotate with respect to the axis of shank 4 through a small angle. Thus, the rod end bearing is self-aligning, i. e. capable of transmitting motion which is not all in one plane.

I have found that suitable materials for ball 1 are non-metallic resilient materials, such as polytetrafluoroethylene, rubbery silicone polymers, nylon and synthetic rubbers. The Shore Durometer Rating of such non-metallic resilient materials should be within the range of the A-scale and minimum hardness is determined by the load to be carried by the bearing during operation.

The self-aligning rod end bearing of my invention is substantially shock proof and highly resistant to abrasion caused by shock and vibration since they are isolated by the resilient ball. Thus, one of the principal causes of wear in rod end bearings is minimized by my invention. Moreover, since the ball and spacer may be removed from the retaining ring by revolving them about 90° from the normal center position in the retaining ring, the rod end bearing of my invention may be permanently installed by forming the retaining ring as an integral part of the link rod for which it is adapted to retain the end bearing. Replacement does not involve replacing the retaining ring as in most conventional rod end bearings. Furthermore, manufacture of the entire rod end bearing including the retaining ring is highly simplified since no machined parts are required. The ball may be molded. The spacer may be cut from stainless steel seamless tubing and suitably rolled back at its ends. The retaining ring also may be manufactured from a short piece of stainless steel seamless tubing extended to spherical shape by means of a rubber bulging dye or by a spinning tool and then electric welded to shank 4, also made of seamless tubing, or welded directly to the rod for which it is to retain the end bearing. Another inexpensive and simple method for constructing the retaining ring and shank is to stamp two identical, symmetrical longitudinal halves from sheet metal. The halves are than electric welded together to form the retaining ring and shank in an integral piece.

I claim:

1. A self-aligning rod end bearing which comprises a metallic spherical retaining ring; a non-metallic resilient parti-spherical ball, having a central bore and a flat surface at each end of said bore, movably mounted in sliding engagement within said retaining ring; and a tubular metallic spacer tightly fitted through the bore of the ball, each end of which spacer is projected beyond the side of the ball and expanded to embrace the flat surface of the ball.

2. A self-aligning rod end bearing according to claim 1 in which each end of the tubular spacer projects beyond the side of the ball and is peened over to embrace the flat surface of the ball.

References Cited in the file of this patent

UNITED STATES PATENTS

| | | |
|---|---|---|
| 2,258,040 | Young | Oct. 7, 1941 |
| 2,478,660 | Keahey | Aug. 9, 1949 |
| 2,652,293 | Phillips | Sept. 15, 1953 |

FOREIGN PATENTS

| | | |
|---|---|---|
| 448,171 | Germany | Aug. 30, 1927 |
| 481,974 | Great Britain | Mar. 22, 1938 |
| 568,201 | Great Britain | Mar. 22, 1945 |